Jan. 28, 1941.  H. KREIDEL  2,230,115
COUPLING FOR FLEXIBLE PIPES AND HOSES
Filed July 13, 1938
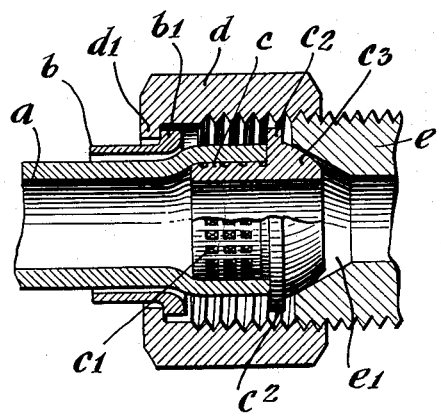
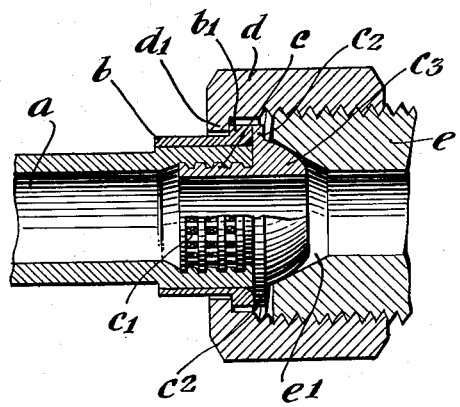
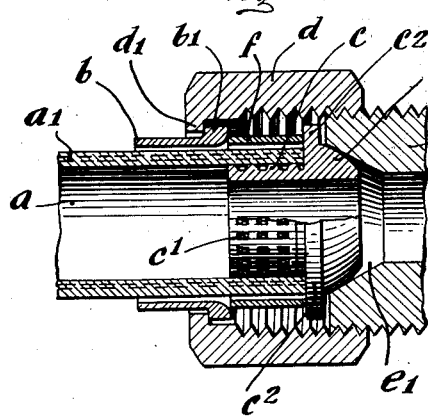
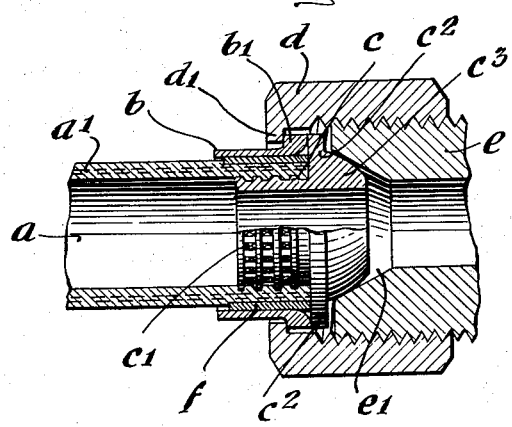
INVENTOR
*Hans Kreidel*
BY
*Cooper, Kerr & Dunham*
ATTORNEYS Patented Jan. 28, 1941

2,230,115

UNITED STATES PATENT OFFICE 2,230,115

COUPLING FOR FLEXIBLE PIPES AND HOSES

Hans Kreidel, Wiesbaden, Germany, assignor to Patex Societe Anonyme, Basel, Switzerland, a corporation of Switzerland Application July 13, 1938, Serial No. 218,900
In Germany February 3, 1938

5 Claims. (Cl. 285—86)

This invention relates to couplings for flexible pipes and hoses of the kind in which the end of the pipe or hose is fitted over a tubular member which, together with the end of the pipe, is held between two coupling members which are adapted to be coupled together.

An object of the present invention is to provide an improved coupling which can readily be attached to the pipe or hose so as to make a perfectly tight joint.

In the improved coupling, in accordance with the present invention, a rigid holding ring, of which the inside diameter is substantially equal to the external diameter of the tube, is displaced axially along the end of the pipe when the two coupling members are coupled together, so as to compress the pipe radially against the tubular member and so obtain a perfectly tight joint. The external diameter of the end of the tubular member which is inserted in the flexible pipe may be slightly greater than the internal diameter of the tube, so that, after insertion, the end of the tube is flared outwardly to a slight extent, or it may be substantially equal to the internal diameter of the pipe in which case a deformable sleeve is fitted over the outside of the end of the flexible pipe. In the former case, when the coupling members are coupled together, the rigid holding ring is pressed tightly against the end of the pipe, while in the latter case the deformable ring is pressed into the surface of the pipe by the rigid holding ring, and, in both cases the pipe is thereby compressed radially against the tubular member.

The coupling members may suitably consist of an externally threaded bored or tubular member and a nut which screws thereon by which the axial displacement of the holding ring is effected.

The tubular member can be provided with hollows, or indentations, preferably arranged in checkerboard fashion, so that, when the holding ring is displaced axially, some of the material of which the pipe is made is forced radially into these cavities, and firmly anchored therein.

In order to prevent the holding ring, when it is displaced axially, from cutting or damaging the pipe, the inner edge of the ring at the end facing the end of the pipe is rounded. This rounding also facilitates the axial displacement of the holding ring.

The tubular member may be provided with a collar against which the end of the pipe bears, while the end of the tubular member which is not inserted in the pipe may be enlarged or in the form of a connecting flange which fits in the mouth of one of the coupling members. One of the coupling members, for example the nut, can serve at one and the same time for fixing the end of the pipe on the tubular member by displacing the holding ring axially or by deforming the metallic sleeve, and, through the agency of the collar, for pressing the enlarged or flanged end of the tubular member against the mouth of the other coupling member.

In order that the invention may be readily understood and carried into effect, two forms of couplings constructed in accordance with the invention are illustrated, by way of example, in the accompanying drawing, in which Figure 1 is a longitudinal section through one form of construction, showing the parts before tightening the coupling members, Fig. 2 is a similar section after the coupling members have been tightened, and Figs. 3 and 4 are similar sections through a slightly modified form of construction.

Referring to the drawing, in all the figures $a$ represents the flexible pipe, $b$ the holding ring which moves axially and of which the inside diameter is substantially the same as the outside diameter of the pipe $a$. The holding ring $b$ is preferably made of metal and undeformable. The reference $c$ designates a tubular member of which one end is inserted in the pipe $a$, while $d$ is a nut which screws on to the threaded coupling member $e$. When the nut $d$ is screwed along the thread on the member $e$, the ring $b$ is moved axially along the pipe $a$. The threaded member $e$ is bored to a diameter substantially the same as the inside diameter of the pipe $a$ and its mouth $e_1$ is widened to form a seating for the enlarged end $c_3$ of the member $c$. The end of the tubular member $c$ which is inserted in the pipe $a$ is provided with cavities or recesses, preferably arranged in checkerboard fashion i. e. in a grid-like pattern, into which the material of which the pipe is made is forced radially when the holding ring $b$ is displaced axially when the nut $d$ is screwed on the threaded member $e$.

The end of the pipe $a$ bears against a collar $c_2$ on the tubular member $c$ which prevents the pipe from being moved axially when the holding ring $b$ is displaced in the same direction, so that the material of the pipe is forced into the cavities in the tubular member $c$. The enlarged end $c_3$ of the tubular member $c$ may be of spherical, conical, or of any other suitable shape, so that it forms a tight joint with the widened mouth $e_1$ when the nut is screwed on the member $e$.

The end of the holding ring $b$ facing the threaded member $e$ has a collar $b_1$ while the edge of its orifice is rounded, affording a wedging portion. The base $d_1$ of the nut bears against the collar $b_1$ of the holding ring $b$ so that, when the nut $d$ is tightened, the holding ring $b$ is moved axially along the pipe $a$. Obviously, before the coupling is tightened, the cylindrical part of the holding ring $b$ must be passed through the opening provided in the base $d_1$ of the nut $d$ as shown in the drawing.

The assembly of the parts shown in Figs. 1 and 2 is effected as follows: After the nut $d$ and the holding ring $b$ have been placed on the pipe to be connected, the tubular member $c$ is inserted in the mouth of the pipe $a$, thus flaring it slightly.

When the nut $d$ is screwed along the threaded member $e$, the holding ring $b$ is displaced axially and the wedging portion of the ring progressively exerts radial pressure on the flared mouth of the pipe $a$, and forces the material of the pipe into the cavities in the tubular block $c$.

As a small quantity of the material of the pipe is also forced back axially, it is advisable also to provide some hollows or cavities on the surface of the collar $c_2$ which faces the pipe into which hollows the material can also be forced. This is particularly desirable when, as shown in Figs. 1 and 2, the outer surface of the tubular block $c$ is provided with cavities or hollows. When such cavities are also provided in the surface of the collar which faces the pipe, both the material of the pipe which is displaced radially as well as that which is displaced axially is forced into the cavities.

After the holding ring $b$ has been displaced axially, it bears against the collar $c_2$ of the tubular block $c$. As the tightening of the nut is continued, the enlarged end $c_3$ is forced against the mouth $e_1$ of the threaded member $e$.

It will be seen that the coupling is effected by means of one and the same tightening device namely the nut $d$, in two operations. In the first, the nut presses the pipe $a$ on to the tubular member $c$. In the second, that is to say, when the holding ring $b$ has abutted against the collar $c_2$ and the tightening of the nut is continued, the tubular block $c$ to which the pipe has been firmly connected is pressed into the mouth $e_1$ of the threaded shoulder $e$. Of course, any other suitable coupling members could be used instead of those illustrated. In the figures, the enlarged end $c_3$ of the tubular member is spherical. Obviously, the coacting parts of the tubular member $c$ and the coupling part $e$ could be of any other suitable form.

Figs. 3 and 4 show another form of coupling which is similar to that described with reference to Figs. 1 and 2.

In Figs. 3 and 4, the pipe $a$ is covered with a metal braid $a_1$, and for this reason lends itself badly to flaring. On this account, the outside diameter of the tubular member $c$ must be substantially equal to the inside diameter of the pipe $a$, and not slightly greater as in Figs. 1 and 2.

The coupling is effected in the following manner. The end of the pipe is provided with a deformable metallic sleeve $f$ of which the inside diameter is substantially equal to the outside diameter of the pipe $a$. When the nut $d$ is tightened, the holding ring $b$ forces the sleeve $f$ to contract radially, that is to say, to decrease in diameter, the effect of which is to cause the material of the pipe to become anchored in the cavities in the tubular block $c$, as previously described.

After the collar $b_1$ which enables the nut to move the holding ring $b$ axially, has come to bear against the collar $c_2$, the enlarged end $c_3$ of the tubular block is forced against the seating $e_1$ in the mouth of the threaded member $e$ with which it forms a tight joint, as previously described in connection with Figs. 1 and 2.

In the arrangement shown in Figs. 3 and 4, the collar $c_2$ forms an abutment not only for the end of the pipe $a$, but also for the deformable metallic sleeve $f$. Consequently, when the holding ring $b$ is displaced axially, the pipe $a$ and the sleeve $f$ are prevented from moving axially and therefore forced to contract radially.

The sleeve $f$ should be sufficiently deformable to be able to contract radially. It is preferably made of metal, but may be made of other material, for instance suitable plastic material, provided it is capable of contracting radially under the action of the displacement of the holding ring $b$.

It is obvious that the material of which the holding ring $b$ and the sleeve $f$ are made and their sizes must be adapted to suit one another so that it will always be the sleeve $f$ and not the ring $b$ which alters its shape.

The coupling can be disconnected and reassembled at will. Should it be desired to disconnect the pipe, the holding ring $b$ must be withdrawn axially so as to permit the end of the pipe $a$ to be freed. In some cases, the coupling part $e$ and the tubular member $c$ can be made in one piece. Then, the end of the pipe $a$ and the sleeve $f$ abut directly against the coupling member $e$.

It will be noted that an ordinary spanner is sufficient for tightening the coupling and no special tools are required.

What I claim is:

1. A coupling for flexible pipes, hoses and the like, with two coupling members with means for coupling the same together, a tubular member having a substantially cylindrical portion over which the end of a flexible pipe is fitted, said tubular member terminating in a shoulder portion substantially perpendicular thereto against which the end of the pipe abuts, means for contracting the end of said pipe comprising a rigid sleeve member having a substantially cylindrical internal bore through which the end of said pipe is passed, said bore being flared at its leading end to define a camming portion, said sleeve having means engageable by one of the coupling members and being movable axially therewith when the coupling members are assembled to cause progressive contraction of the end of said pipe radially and substantially uniformly about the cylindrical portion of said tubular member, said members being provided with space into which a portion of the material of said pipe may flow upon contraction of its end.

2. A pipe coupling in accordance with claim 1 wherein the external diameter of the cylindrical portion of the tubular member is slightly greater than the internal diameter of the pipe whereby the end of the pipe is pressed tightly against the tubular member upon axial displacement of the sleeve.

3. A pipe coupling in accordance with claim 1 wherein the external diameter of the cylindrical portion of the tubular member is substantially equal to the internal diameter of the pipe and including a deformable ring fitted over the end of the pipe which is compressed radially by the sleeve when the latter is displaced axially.

4. A pipe coupling in accordance with claim 1 wherein the outer surface of the cylindrical portion of the tubular member is provided with a plurality of spaced cell-like cavities disposed in a grid-like pattern into which the material of the pipe is pressed.

5. A pipe coupling in accordance with claim 1 wherein the external diameter of the cylindrical portion of the tubular member is substantially equal to the internal diameter of the pipe and including a deformable ring fitted over the end of the pipe which is compressed radially by the sleeve when the latter is displaced axially, the shoulder portion of said tubular member serving as an abutment for said ring.

HANS KREIDEL.